United States Patent
Fernandes (10) Patent No.: US 10,645,407 B2
(45) Date of Patent: *May 5, 2020

(54) SYSTEMS AND METHODS FOR PROVIDING TRANSCODED PORTIONS OF A VIDEO

(71) Applicant: GoPro, Inc., San Francisco, CA (US)

(72) Inventor: Cedric Fernandes, San Ramon, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,225

(22) Filed: Mar. 29, 2019

(65) Prior Publication Data

US 2019/0230372 A1 Jul. 25, 2019

Related U.S. Application Data

(63) Continuation of application No. 15/183,686, filed on Jun. 15, 2016, now Pat. No. 10,250,894.

(51) Int. Cl.
*H04N 7/12* (2006.01)
*H04N 19/40* (2014.01)
(Continued)

(52) U.S. Cl.
CPC ........... *H04N 19/40* (2014.11); *H04L 65/601* (2013.01); *H04L 65/607* (2013.01); *H04N 21/2343* (2013.01); *H04N 21/2405* (2013.01)

(58) Field of Classification Search
CPC ........... H04N 21/2743; H04N 21/8549; H04N 21/47205; H04N 21/84; H04N 21/8456
See application file for complete search history.

(56) References Cited

U.S. PATENT DOCUMENTS

| 7,222,356 B1 | 5/2007 | Yonezawa |
| 7,483,618 B1 | 1/2009 | Edwards |

(Continued)

FOREIGN PATENT DOCUMENTS

WO 2009040538 A1 4/2009

OTHER PUBLICATIONS

PCT International Written Opinion for PCT/US2015/041624, dated Dec. 17, 2015, 7 Pages.

(Continued)

*Primary Examiner* — Jessica M Prince
(74) *Attorney, Agent, or Firm* — Esplin & Associates, PC (57) ABSTRACT

Multiple videos having individual time durations may be obtained, including a first video with a first time duration. The videos may include visual information defined by one or more electronic media files. An initial portion of the first time duration where the one or more electronic media are to be transcoded may be determined, including determining whether the first time duration is greater than a predefined threshold and if the first time duration is greater than the predefined threshold, determining the initial portion to be an initial time duration that is less than the first time duration. One or more transcoded media files may be generated during the initial portion. A request for the first video may be received from a client computing platform. In response to receipt of the request, the one or more transcoded media files may be transmitted to the client computing platform for display.

20 Claims, 4 Drawing Sheets

(51) Int. Cl.
*H04L 29/06* (2006.01)
*H04N 21/2343* (2011.01)
*H04N 21/24* (2011.01)

(56) References Cited

U.S. PATENT DOCUMENTS

| | | | |
|---|---|---|---|
| 7,681,223 | B2 | 3/2010 | Takahashi |
| 8,446,433 | B1 | 5/2013 | Mallet |
| 8,611,422 | B1 | 12/2013 | Yagnik |
| 8,718,447 | B2 | 5/2014 | Yang |
| 8,763,023 | B1 | 6/2014 | Goetz |
| 9,077,956 | B1 | 7/2015 | Morgan |
| 9,253,533 | B1 | 2/2016 | Morgan |
| 2004/0128317 | A1 | 7/2004 | Sull |
| 2005/0025454 | A1 | 2/2005 | Nakamura |
| 2005/0060365 | A1 | 3/2005 | Robinson |
| 2006/0156219 | A1 | 7/2006 | Haot |
| 2007/0002946 | A1 | 1/2007 | Bouton |
| 2007/0106419 | A1 | 5/2007 | Rachamadugu |
| 2007/0168543 | A1 | 7/2007 | Krikorian |
| 2007/0204310 | A1 | 8/2007 | Hua |
| 2007/0230461 | A1 | 10/2007 | Singh |
| 2008/0044155 | A1 | 2/2008 | Kuspa |
| 2008/0123976 | A1 | 5/2008 | Coombs |
| 2008/0152297 | A1 | 6/2008 | Ubillos |
| 2008/0163283 | A1 | 7/2008 | Tan |
| 2008/0177706 | A1 | 7/2008 | Yuen |
| 2008/0253735 | A1 | 10/2008 | Kuspa |
| 2008/0313541 | A1 | 12/2008 | Shafton |
| 2009/0213270 | A1 | 8/2009 | Ismert |
| 2010/0086216 | A1 | 4/2010 | Lee |
| 2010/0104261 | A1 | 4/2010 | Liu |
| 2010/0183280 | A1 | 7/2010 | Beauregard |
| 2010/0231730 | A1 | 9/2010 | Ichikawa |
| 2010/0245626 | A1 | 9/2010 | Woycechowsky |
| 2010/0251295 | A1 | 9/2010 | Amento |
| 2010/0278504 | A1 | 11/2010 | Lyons |
| 2010/0278509 | A1 | 11/2010 | Nagano |
| 2010/0281375 | A1 | 11/2010 | Pendergast |
| 2010/0281386 | A1 | 11/2010 | Lyons |
| 2010/0318660 | A1 | 12/2010 | Balsubramanian |
| 2011/0075990 | A1 | 3/2011 | Eyer |
| 2011/0093605 | A1 | 4/2011 | Choudhury |
| 2011/0093798 | A1 | 4/2011 | Shahraray |
| 2011/0206351 | A1 | 8/2011 | Givoly |
| 2011/0293250 | A1 | 12/2011 | Deever |
| 2012/0027381 | A1 | 2/2012 | Kataoka |
| 2012/0030029 | A1 | 2/2012 | Flinn |
| 2012/0057852 | A1 | 3/2012 | Devleeschouwer |
| 2012/0123780 | A1 | 5/2012 | Gao |
| 2012/0192225 | A1 | 7/2012 | Harwell |
| 2012/0198319 | A1 | 8/2012 | Agnoli |
| 2012/0311448 | A1 | 12/2012 | Achour |
| 2013/0041948 | A1 | 2/2013 | Tseng |
| 2013/0104177 | A1 | 4/2013 | Kwan |
| 2013/0136193 | A1 | 5/2013 | Hwang |
| 2013/0151970 | A1 | 6/2013 | Achour |
| 2013/0166303 | A1 | 6/2013 | Chang |
| 2013/0185388 | A1 | 7/2013 | Mackie |
| 2013/0195429 | A1 | 8/2013 | Fay |
| 2013/0197967 | A1 | 8/2013 | Pinto |
| 2013/0208942 | A1 | 8/2013 | Davis |
| 2013/0222583 | A1 | 8/2013 | Earnshaw |
| 2013/0259399 | A1 | 10/2013 | Ho |
| 2013/0283301 | A1 | 10/2013 | Avedissian |
| 2013/0287214 | A1 | 10/2013 | Resch |
| 2013/0300939 | A1 | 11/2013 | Chou |
| 2013/0318443 | A1 | 11/2013 | Bachman |
| 2013/0343727 | A1 | 12/2013 | Rav-Acha |
| 2014/0072285 | A1 | 3/2014 | Shynar |
| 2014/0093164 | A1 | 4/2014 | Noorkami |
| 2014/0096002 | A1 | 4/2014 | Dey |
| 2014/0105573 | A1 | 4/2014 | Hanckmann |
| 2014/0161351 | A1 | 6/2014 | Yagnik |
| 2014/0165119 | A1 | 6/2014 | Liu |
| 2014/0169766 | A1 | 6/2014 | Yu |
| 2014/0212107 | A1 | 7/2014 | Saint-Jean |
| 2014/0219634 | A1 | 8/2014 | McIntosh |
| 2014/0226953 | A1 | 8/2014 | Hou |
| 2014/0232818 | A1 | 8/2014 | Carr |
| 2014/0245336 | A1 | 8/2014 | Lewis, II |
| 2014/0300644 | A1 | 10/2014 | Gillard |
| 2014/0328570 | A1 | 11/2014 | Cheng |
| 2014/0341527 | A1 | 11/2014 | Hurley |
| 2014/0341528 | A1 | 11/2014 | Mahate |
| 2014/0366052 | A1 | 12/2014 | Ives |
| 2015/0015680 | A1 | 1/2015 | Wang |
| 2015/0022355 | A1 | 1/2015 | Pham |
| 2015/0029089 | A1 | 1/2015 | Kim |
| 2015/0156281 | A1* | 6/2015 | Krieger .................. H04N 19/40 709/203 |
| 2015/0186073 | A1 | 7/2015 | Pacurariu |
| 2015/0281710 | A1 | 10/2015 | Sievert |
| 2015/0287435 | A1 | 10/2015 | Land |
| 2015/0318020 | A1 | 11/2015 | Pribula |
| 2015/0375117 | A1 | 12/2015 | Thompson |
| 2015/0382083 | A1 | 12/2015 | Chen |
| 2016/0005440 | A1 | 1/2016 | Gower |
| 2016/0026874 | A1 | 1/2016 | Hodulik |
| 2016/0027470 | A1 | 1/2016 | Newman |
| 2016/0027475 | A1 | 1/2016 | Hodulik |
| 2016/0029105 | A1 | 1/2016 | Newman |
| 2016/0055885 | A1 | 2/2016 | Hodulik |
| 2016/0225405 | A1 | 8/2016 | Matias |
| 2016/0225410 | A1 | 8/2016 | Lee |
| 2016/0234345 | A1 | 8/2016 | Roberts |
| 2016/0300594 | A1 | 10/2016 | Allen |
| 2016/0358603 | A1 | 12/2016 | Azam |
| 2016/0366330 | A1 | 12/2016 | Boliek |
| 2017/0222987 | A1* | 8/2017 | Krieger .................. H04L 67/06 |

OTHER PUBLICATIONS

PCT International Search Report and Written Opinion for PCT/US15/12086 dated Mar. 17, 2016, 7 pages.
Schroff et al., 'FaceNet: A Unified Embedding for Face Recognition and Clustering,' IEEE Conference on Computer Vision and Pattern Recognition (CVPR), 2016, 10 pgs.
Parkhi et al., 'Deep Face Recognition,' Proceedings of the British Machine Vision, 2015,12 pgs.
Iandola et al., 'SqueezeNet: AlexNet-level accuracy with 50x fewer parameters and <0.5MB model size', arXiv:1602.07360v3 [cs.CV] Apr. 6, 2016 (9 pgs.).
Ioffe et al., 'Batch Normalization: Accelerating Deep Network Training by Reducing Internal Covariate Shift,' arXiv:1502.03167, 2015, 11 pgs.
He et al., 'Deep Residual Learning for Image Recognition,' arXiv:1512.03385, 2015,12 pgs.
Han et al., Deep Compression: Compressing Deep Neural Networks with Pruning, Trained Quantization and Huffman Coding, International Conference on Learning Representations 2016, 14 pgs.
PCT International Search Report and Written Opinion for PCT/US16/31076, dated Aug. 8, 2016, 19 Pages.
Yang et al., 'Unsupervised Extraction of Video Highlights via Robust Recurrent Auto-encoders' arXiv:1510.01442v1 [cs.CV] Oct. 6, 2015 (9 pgs).
Tran et al., 'Learning Spatiotemporal Features with 3D Convolutional Networks', arXiv:1412.0767 [cs.CV] Dec. 2, 2014 (9 pgs).
PCT International Search Report for PCT/US15/41624 dated Nov. 4, 2015, 5 pages.
PCT International Search Report for PCT/US15/23680 dated Aug. 3, 2015, 4 pages.
PCT International Preliminary Report on Patentability for PCT/US2015/023680, dated Oct. 4, 2016, 10 pages.
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

(56) References Cited

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Ernoult, Emeric, 'How to Triple Your YouTube Video Views with Facebook', SocialMediaExaminer.com, Nov. 26, 2012, 16 pages.

\* cited by examiner

SYSTEMS AND METHODS FOR PROVIDING TRANSCODED PORTIONS OF A VIDEO

FIELD

The disclosure relates to systems and methods for transcoding media files.

BACKGROUND

Users may capture high resolution versions of media content using a capture device. Media content may include one or more of video, photo, time-lapse, photo bursts, and/or other content. Capture devices may include personal mobile devices, such as a smartphone or digital camera. Users may wish to share the content that they captured with other people. Mobile devices and/or other capture devices may incorporate high-speed data connections and powerful processors, making it easier and faster to share media content directly from one device to another. Original media content may be stored as a digital file in a particular media format. Format compatibility with different capture devices may be limited by device specifications. As such, a stored media format of media content may be incompatible for playback and/or consumption for some or all other devices.

SUMMARY

One aspect of the disclosure relates to a system for transcoding media files, in accordance with one or more implementations. The system may obtain media content. Media content may include one or more of video, video segments, individual photos, time-lapse photos, photo bursts, and/or other media content. Although descriptions of one or more implementations of the system presented herein may be directed to video and/or video segment type media content, it is noted that other implementations may be similarly configured to carry out the same or similar operations for other media content.

Individual video segments may include individual time durations. Individual video segments may include visual information defined by one or more electronic media files. For example, the one or more electronic media files may define aspects of the individual videos including frame sizes, frame rates, resolutions, bitrates (video bitrates and/or audio bitrates), and/or other aspects of the individual videos. The multiple videos may include a first video with a first time duration. The first video may be stored in a first video format. The system may determine an initial portion of the first time duration where the one or more electronic media files defining the visual information of the first video for the initial portion are to be transcoded. The system may determine whether the first time duration is greater than a predefined threshold. If the first time duration is greater than the predefined threshold, the system may determine the initial portion to be an initial time duration that is less than the first time duration. The system may generate one or more transcoded media files defining the visual information in the first video during the initial portion. The system may be configured to perform bitrate conversion, CODEC conversion, frame size conversion, and/or other conversions in order to generate the one or more transcoded media files defining the visual information during the initial portion of the first video. As such, the system may generate a second video format for the first video that may be compatible for playback with one or more client computing platforms. The first video may be requested for playback by a particular client computing platform. The request may include information about the client computing platform, including specifications of the client computing platform. In response to receipt of the request, the system may effectuate transmission of the one or more transcoded media files compatible with the client computing platform for display.

In some implementations, the system may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of a video component, an authentication component, a determination component, a generation component, a request component, and/or other components.

The video component may be configured to obtain multiple vides. The multiple videos may be included within a repository of videos. A repository of images and/or videos may be available via the system. The repository of images and/or videos may be stored within an electronic storage, one or more server(s), one or more client computing platform(s), external resources, a cloud, and/or any other storage location. Individual images and/or videos of the repository of images and/or videos may be stored in different locations. The repository of images and/or videos may be associated with different users. The videos may include a compilation of videos, video segments, video clips, and/or still images.

Individual videos may have individual time durations. For example, a first video may include a first time duration. The first time duration may be a duration represented by a unit of time, such as seconds, minutes, hours, some combination of more than one unit of time, and/or other units of time. For example, a time duration of a given video may include 2 hours and 35 seconds of captured video footage.

Individual videos may include visual information defined by one or more electronic media files. In some embodiments, individual videos may include audio information defined by the one or more electronic media files. The various videos may be generated by image capture devices. Image capture devices may include a camera. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

The authentication component may be configured to authenticate a user associated with client computing platform(s) accessing the repository of images and/or video segments via the system. The authentication component may manage accounts associated with users and/or consumers of the system. The user accounts may include user information associated with users and/or consumers of the user accounts. User information may include information stored by server(s), client computing platform(s), and/or other storage locations.

The determination component may be configured to determine an initial portion of a first time duration of a first video where the one or more electronic media files defining the visual information of the first video may be transcoded. The initial portion may have an initial time duration. The initial portion may be a length of the first video (e.g., the initial time duration of the initial portion may be the first time duration) or the initial portion may be a length that is shorter (e.g., less than) the first time duration. The determination component may be configured to determine a portion of the first video to transcode, where the portion may be less than the full length of the first video, the portion may be the full length of the first video, the portion may be a combination of different portions less than the full length of the first video, and/or the portion may be one or more other portions of the first video.

Determining the initial portion of the first time duration where the one or more electronic media files defining the visual information of the first video are to be transcoded may include determining whether the first time duration is greater than a predefined threshold. The predefined threshold may be a length of time. The predefined threshold may be predefined by an administrator of the system. The predefined threshold may be predefined by the system. The predefined threshold may vary for different videos based upon the one or more electronic media files defining the visual information of the different videos.

If the first time duration is greater than the predefined threshold, the determination component may be configured to determine the initial portion of the first video to be an initial time duration that is less than the first time duration. That is, if the length of the first video is greater than the predefined threshold, the determination component may determine that a shorter portion (e.g., the initial portion) of the first video may be transcoded rather than transcoding the full length of the first video (e.g., the first time duration).

The generation component may be configured to generate one or more transcoded media files defining the visual information in the first video during the initial portion. The generation component may be configured to generate one or more transcoded media files that may be compatible with other client computing platforms in order to view the first video. For example, the generation component may be configured to generate one or more transcoded media files defining the visual information by generating a lower quality/resolution version of the initial portion of the first video than an original resolution (e.g., a high resolution version) of the first video, such that the lower quality version of the high definition video may be suitable for streaming in low-bandwidth network conditions. As such, the generation component may be configured to generate the second video format for the first video from the first video format of the first video such that the second video format may be compatible for viewing from one or more client computing platforms. In some implementations, media files may be transcoded and stored in electronic storage for retrieval at a later time. In some implementations, media files may be transcoded in response to receiving requests (see, e.g., request component) from one or more client computing platforms for consuming content.

The request component may be configured to receive a request for the first video from a client computing platform. The request may specify a particular portion of the first video, the request may include a request for an entirety of the first video, and/or the request may include a request for a preview of the first video. The particular portion may be specified using start and/or end times for the portion requested for the first video. The request may include information pertaining to the client computing platform that sent that request. As discussed above, different versions and/or formats of the first video may be transcoded to be compatible with different client computing platforms.

In some implementations, in response to receipt of the request, the request component may be configured to retrieve one or more transcoded media files for the first video corresponding to portion(s) of the first video corresponding to the request that may be compatible with the client computing platform that sent the request. Upon retrieval, the request component may be configured to effectuate transmission of the one or more transcoded media files to the client computing platform for display of the visual information defined by the one or more transcoded media files.

In some implementations, in response to receipt of the request, the generation component may be configured to generate one or more transcoded media files and the request component may be configured to retrieve the one or more transcoded media files. Upon retrieval, the request component may be configured to effectuate transmission of the one or more transcoded media files to the client computing platform for display of the visual information defined by the one or more transcoded media files.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
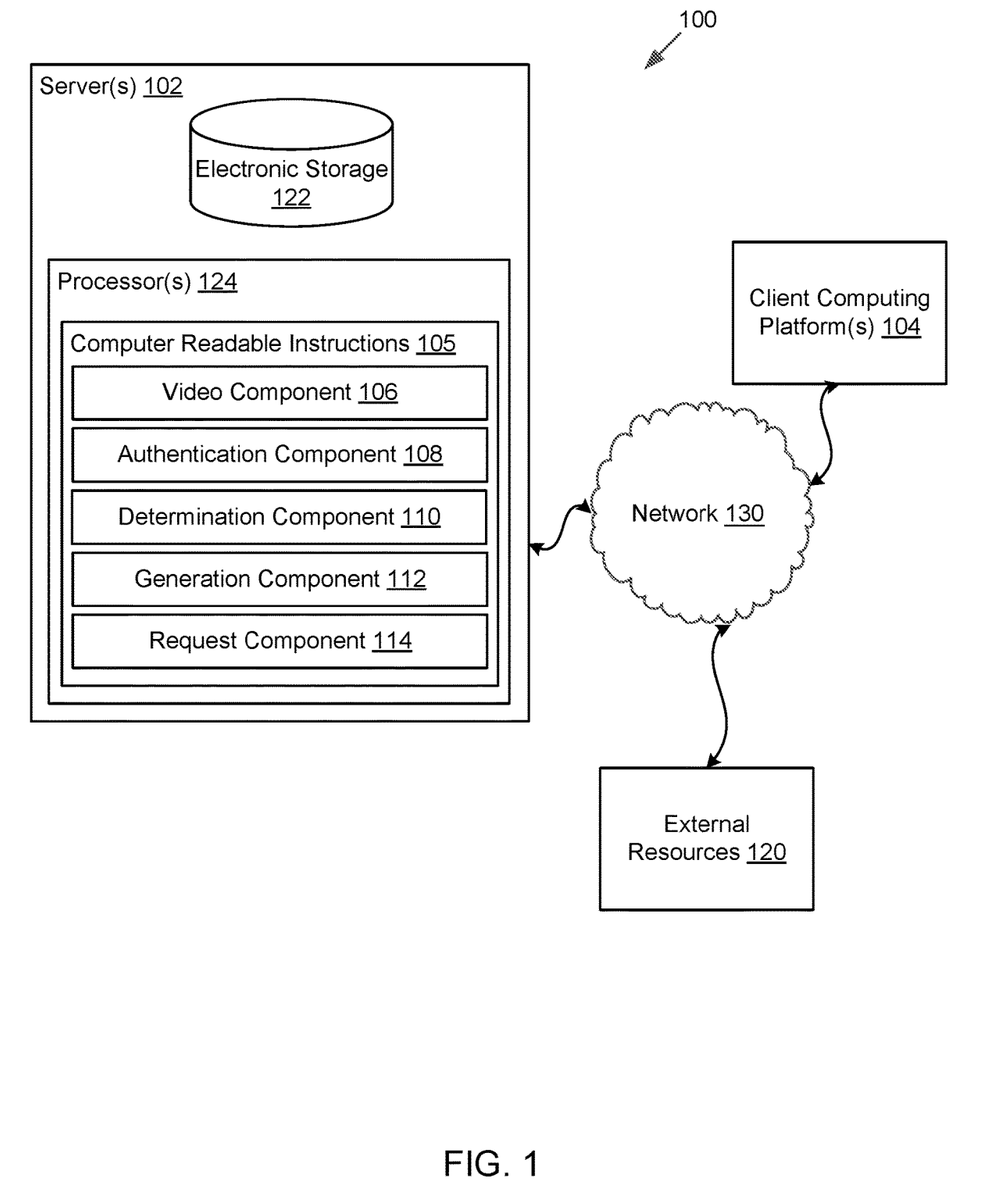
FIG. 1 illustrates a system for transcoding media files, in accordance with one or more implementations.

FIG. 1 illustrates a system 100 that transcodes videos, in accordance with one or more implementations. System 100 may obtain multiple video segments. Individual video segments may include individual time durations. Individual video segments may include visual information defined by one or more electronic media files. For example, the one or more electronic media files may define aspects of the individual videos including frame sizes, frame rates, resolutions, bitrates (video bitrates and/or audio bitrates), and/or other aspects of the individual videos. The multiple videos may include a first video with a first time duration. The first video may be stored in a first video format. System 100 may determine an initial portion of the first time duration where the one or more electronic media files defining the visual information of the first video for the initial portion are to be transcoded. System 100 may determine whether the first time duration is greater than a predefined threshold. If the first time duration is greater than the predefined threshold, system 100 may determine the initial portion to be an initial time duration that is less than the first time duration. System 100 may generate one or more transcoded media files defining the visual information in the first video during the initial portion. System 100 may be configured to perform bitrate conversion, CODEC conversion, frame size conversion, and/or other conversions in order to generate the one or more transcoded media files defining the visual information during the initial portion of the first video. As such, system 100 may generate a second video format for the first video that may be compatible for playback with one or more client computing platforms. The first video may be requested for playback by a particular client computing platform. The request may include information about the client computing platform, including specifications of the client computing platform. In response to receipt of the request, system 100 may effectuate transmission of the one or more transcoded media files compatible with the client computing platform for display.

As is illustrated in FIG. 1, system 100 may include one or more server(s) 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of video component 106, authentication component 108, determination component 110, generation component 112, request component 114, and/or other components.

In some implementations, server(s) 102 may be configured to provide remote hosting of the features and/or functions of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of client computing platform(s) 104 may include machine-readable instructions (not shown in FIG. 1) comprising the same or similar components as machine-readable instructions 105 of server(s) 102. Client computing platform (s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104. For example, an image capturing device capturing a video may be configured to locally execute the one or more components that may be the same or similar to the machine-readable instructions 105 in or near real-time.

Client computing platform(s) 104 may include one or more of a cellular telephone, a smartphone, a digital camera, a laptop, a tablet computer, a desktop computer, a television set-top box, smart TV, a gaming console, and/or other computing platforms.

Server(s) 102, client computing platform(s) 104, and/or external resources 120 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Video component 106 may be configured to obtain multiple videos. The multiple videos may be included within a repository of videos. A repository of images and/or videos may be available via system 100. The repository of images and/or videos may be stored within electronic storage 122, one or more server(s) 102, one or more client computing platform(s) 104, external resources 120, a cloud, and/or other storage locations. Individual images and/or videos of the repository of images and/or videos may be stored in different locations. The repository of images and/or videos may include images and/or videos associated with different users. The videos may include one or more of a compilation of videos, video segments, video clips, and/or still images. While the present disclosure may be directed to previously captured videos captured by one or more image capturing devices, one or more other implementations of system 100, server(s) 102, and/or client computing platform(s) 104 may be configured for other types of media items. Other types of media items may include one or more of audio files (e.g., music, podcasts, audio books, and/or other audio files), multimedia presentations, slideshows, and/or other media files. The multiple videos may be obtained from one or more storage locations associated with server(s) 102, client computing platform(s) 104, and/or other storage locations where video segments may be stored.

Individual videos may include multiple frames. Individual videos may be composed of multiple still images, individually known as frames. A combination of multiple frames may compose a moving picture, such as video content of a video. The video may include a playback of live captured video (e.g., captured via one or image capture devices).

Individual videos may have individual time durations. For example, a first video may include a first time duration. The first time duration may be a duration represented by a unit of time, such as seconds, minutes, hours, some combination of more than one unit of time, and/or other units of time. For example, a time duration of a given video may include 2 hours and 35 seconds of captured video footage.

Individual videos may include visual information defined by one or more electronic media files. In some embodiments, individual videos may include audio information defined by the one or more electronic media files. The various videos may be generated by image capture devices. Image capture devices may include a camera. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

Individual videos may be stored in a first video format. The one or more electronic media files may define aspects of the individual videos including visual information, audio information, and/or other aspects of the individual videos. For example, the one or more electronic media files may define aspects of the individual videos including frame sizes, frame rates, resolutions, bitrates (video bitrates and/or audio bitrates), and/or other aspects of the individual videos. The first video format may include a format that the video was captured in, depending upon the image capture device and/or settings of the image capture device that captured the individual videos. Video formats may include H.261, H.263, H.264, M-PEG, MPEG-1, MPEG-2, MPEG-4 AVI, Ogg, Theora, VC-1, other video formats, and/or combinations of video formats. The one or more electronic media files may define aspects of the first video format. For example, the one or more electronic media files may define the first video format in high-definition with a 1980×1024 pixel resolution and 5.1 channels of audio. In this manner, the one or more electronic media files define the visual information and/or audio information that a consumer may view while consuming the video.

Different client computing platform(s) 104 (e.g., different smartphones, tablets, etc.) may include different specifications and/or capabilities. Further, different models of the same client computing platform(s) 104 may include different specifications and/or capabilities. For example, a first client computing platform may include specifications and/or capabilities including a default display resolution, a defined display size, storage space, processing capabilities, and/or other specifications and/or capabilities, while a second client computing platform may include some or all different specifications and/or capabilities than the first client computing platform. Due to the discrepancy of client computing platform specifications and/or capabilities, some video formats may not be compatible for viewing with some or all other client computing platforms. As such, the one or more electronic media files defining the visual information and/or audio information in the first video format of a particular video may be transcoded to define the visual information and/or the audio information in a second video format such that the second video format may be compatible with the client computing platform receiving that particular video. For example, one client computing platform may include a high resolution display with high processing power, while another client computing platform may include a lower resolution display with a less powerful processor and less memory.

Transcoding may refer to digital-to-digital conversion of data encoded in one format into another encoded format. In some embodiments, transcoding may be done in two steps. First, the data in the first video format may be decoded and converted to an intermediary format. Second, the data in the intermediary format may be encoded and converted to a target format (e.g., the second video format).

The authentication component 108 may be configured to authenticate a user associated with client computing platform(s) accessing the repository of images and/or video segments via the system. The authentication component 108 may manage accounts associated with users and/or consumers of system 100. The user accounts may include user information associated with users and/or consumers of the user accounts. User information may include information stored by server(s), client computing platform(s), and/or other storage locations.

Determination component 110 may be configured to determine an initial portion of the first time duration where the one or more electronic media files defining the visual information of the first video are to be transcoded. The initial portion may have an initial time duration. The initial portion may be a length of the first video (e.g., the initial time duration of the initial portion may be the first time duration) or the initial portion may be a length that is shorter (e.g., less than) the first time duration. That is, determination component 110 may be configured to determine a portion of the first video to transcode, where the portion may be less than the full length of the first video, the portion may be the full length of the first video, the portion may be a combination of different portions less than the full length of the first video, and/or the portion may be any other portion of the first video.

Determining the initial portion of the first time duration where the one or more electronic media files defining the visual information of the first video are to be transcoded may include determining whether the first time duration is greater than a predefined threshold. The predefined threshold may be a length of time. The predefined threshold may be predefined by an administrator of system 100. The predefined threshold may be predefined by system 100. The predefined threshold may vary for different videos based upon the one or more electronic media files defining the visual information of the different videos.

If the first time duration is greater than the predefined threshold, determination component 110 may be configured to determine the initial portion of the first video to be an initial time duration that is less than the first time duration. That is, if the length of the first video is greater than the predefined threshold, determination component 110 may determine that a shorter portion (e.g., the initial portion) of the first video may be transcoded rather than transcoding the full length of the first video (e.g., the first time duration). For example, referring to FIG. 2, if the first video has a length of 5 minutes and 30 seconds, then first time duration 200 of the first video would be 5 minutes and 30 seconds. If 5 minutes and 30 seconds is greater than a predefined threshold of 3 minutes (e.g., predefined threshold 202), then determination component 110 may be configured to determine the initial portion of the first video to transcode to be an initial time duration that is shorter in length than first time duration 200 (e.g., the initial time duration should be less than 5 minutes and 30 seconds).

Figure 2:
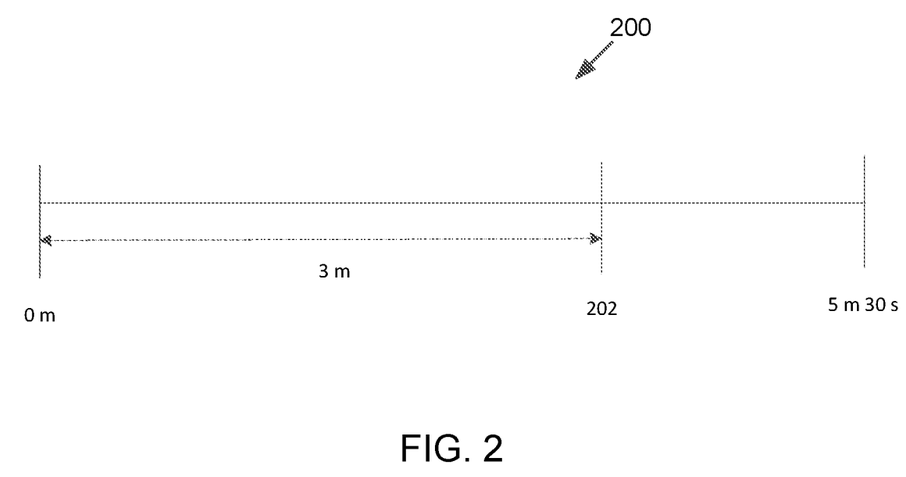
FIG. 2 illustrates an exemplary timeline of a video, in accordance with one or more implementations.

The initial time duration that is less than the first time duration may be a random initial time duration that is less than the first time duration (e.g., anywhere within the first time duration of the first video, such as near the beginning, the middle, and/or the end of the first time duration of the first video), it may be a predefined time duration (e.g., predefined by an administrator of system 100, system 100 itself, etc.) that is less than the first time duration, it may be the predefined threshold (e.g., anywhere within the first time duration of the first video, such as near the beginning, the middle, and/or the end of the first time duration of the first video), it may be determined based upon aspects of the first video, it may be a proportion of the first time duration (e.g., the first 10% of the first time duration, the last 5% of the first time duration, and/or any proportion within the first time duration of the first video), and/or it may be any other time duration that may be determined and/or predefined.

Referring back to FIG. 1, if the first time duration is equal to or less than the predefined threshold, determination component 110 may be configured to determine the initial portion of the first video to be an initial time duration that is the same as and/or equivalent to the first time duration. That is, if the length of the first video is equal to or less than the predefined threshold, determination component 110 may determine that the full length of the first video may be transcoded to a single transcoded media file rather than transcoding a portion that is less than the full length of the first video. For example, if the first video has a length of 3 minutes and 30 seconds, then the first time duration of the first video would be 3 minutes and 30 seconds. If 3 minutes and 30 seconds is less than a predefined threshold of 5 minutes, then determination component 110 may be configured to determine the initial portion of the first video to transcode to be an initial time duration that is equal to the first time duration (e.g., 3 minutes and 30 seconds). As such, determination component 110 may be configured to determine that the one or more electronic media files defining the visual information for the entire length and/or duration of the first video are to be transcoded rather than just a part or portion of the one or more electronic media files defining the visual information of the first video.

Generation component 112 may be configured to generate one or more transcoded media files defining the visual information in the first video during the initial portion. Generation component 112 may be configured to generate one or more transcoded media files that may be compatible with other client computing platforms in order to view the first video. For example, generation component 112 may be configured to generate one or more transcoded media files defining the visual information by generating a lower quality/resolution version of the initial portion of the first video than an original resolution (e.g., a high resolution version) of the first video, such that the lower quality version of the high definition video may be suitable for streaming in low-bandwidth network conditions. In some implementations, media files may be transcoded by generation component 112 and stored in electronic storage for retrieval at a later time. In some implementations, media files may be transcoded by generation component 112 in response to receiving requests (see, e.g., request component 114) from one or more client computing platforms for consuming content.

Generation component 112 may be configured to perform bitrate conversion, CODEC conversion, frame size conversion, and/or other conversions in order to generate the one or more transcoded media files defining the visual information during the initial portion of the first video. As such, generation component 112 may be configured to generate the second video format for the first video from the first video format of the first video such that the second video format may be compatible for viewing from one or more client computing platforms.

In some embodiments, if generation component 112 generates one or more transcoded media files for the initial portion of the first video that has an initial time duration that is less than the first time duration, generation component 112 may be configured to include a link within the one or more transcoded media files. The link may redirect a user consuming the one or more transcoded media files on a client computing platform to an end-point that may return one or more transcoded media files for the remainder of the first video. In this manner, the user consuming the one or more transcoded media files for the initial portion of the first video may initialize the link (e.g., by clicking, tapping, selecting the link via the client computing platform that the one or more transcoded media files may be transmitted to, discussed below), upon consumption of the transcoded portion of the initial portion in order to be redirected to one or more transcoded media files for the remainder of the first video. The user may initialize the link prior to consuming the one or more transcoded media files for the initial portion of the first video, during consumption of the one or more transcoded media files for the initial portion of the first video, and/or at any other time in order to access one or more transcoded media files for the remainder of the first video. Generation component 112 may be configured to generate the one or more transcoded media files defining the visual information for the remainder of the first video at and/or near real-time to the user requesting such additional transcoded media files via the link, and/or may generate the one or more transcoded media files defining the visual information for the remainder of the first video prior to the user requesting such additional transcoded media files via the link, and/or at any other time.

In some embodiments, generation component 112 may be configured to generate a playlist of the one or more transcoded media files, either for the initial portion of the first video and/or for the additional transcoded media files. As such, the one or more transcoded media files for the initial portion of the first video may point to one or more of the additional transcoded media files, which may then point to any other additional transcoded media files, and so on for the remainder of the one or more transcoded media files for the first video.

Generation component 112 may be configured to store the one or more transcoded media files defining the visual information in the first video during the initial portion. Generation component 112 may be configured to store the one or more transcoded media files within electronic storage 122 and/or an external storage (not shown). Generation component 112 may be configured to store additional transcoded media files for the remainder of the first video within electronic storage 122 and/or an external storage (not shown).

Request component 114 may be configured to receive a request for the first video from a client computing platform. The request may specify a particular portion of the first video and/or the request may include a request for an entirety of the first video. The particular portion may be specified using start and/or end times for the portion requested for the first video. The request may include information pertaining to the client computing platform that sent that request. As discussed above, different versions and/or formats of the first video may be transcoded to be compatible with different client computing platforms.

In response to receipt of the request, request component 114 may be configured to retrieve the one or more transcoded media files for the first video corresponding toe portion(s) of the first video corresponding to the request that may be compatible with the client computing platform that sent the request. Upon retrieval, request component 114 may be configured to effectuate transmission of the one or more transcoded media files to the client computing platform for display of the visual information defined by the one or more transcoded media files.

Figure 3:
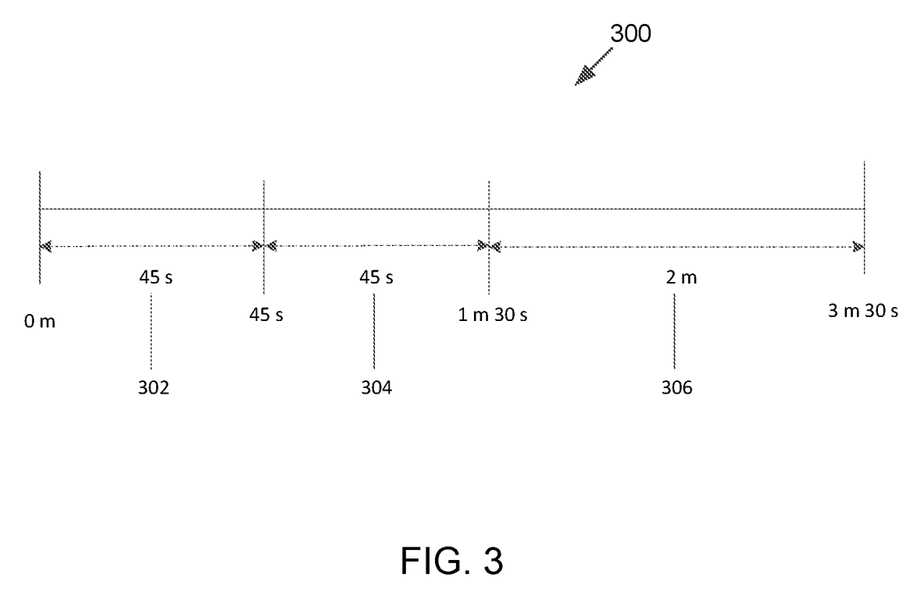
FIG. 3 illustrates an exemplary timeline of a video, in accordance with one or more implementations.

In some embodiments, system 100 may be configured to define one or more segment portions within the first video. Individual segment portions may have segment time durations. For example and referring to FIG. 3, if the first video has a first time duration of 3 minutes and 30 seconds (e.g., first time duration 300), a first segment portion may have first segment time duration 302 of less than 3 minutes and 30 seconds (e.g., first segment time duration 302 may be the first 45 seconds of first time duration 300, such that first segment time duration 302 spans from 0 seconds-45 seconds of first time duration 300). A second segment portion may have second segment time duration 304 of less than 3 minutes and 30 seconds (e.g., second segment time duration 304 may span from 45 seconds-1 minute and 30 seconds of first time duration 300). A sum of the individual segment time durations for the first video may be equal to the first time duration. Continuing the example above, a third segment portion may have third segment time duration 306 of less than 3 minutes and 30 seconds (e.g., third segment time duration 306 may span from 1 minute and 30 seconds-3 minutes and 30 seconds of first time duration 300). As such, the sum of the three segment portions may equal 3 minutes and 30 seconds (e.g., first time duration 300).

Referring back to FIG. 1, system 100 may be configured to store the one or more segment portions as separate individual segment portions of the first video. For example, the first segment portion may be stored as a separate file than the first video, the second segment portion may be stored as a separate file than the first video and/or the first segment portion, the third segment portion may be stored as a separate file than the first video, the first segment portion, and/or the second segment portion, and so on.

If the first time duration of the first video is greater than the predefined threshold, as discussed above, the initial time duration may be a sum of an integer number of segment time durations. For example and referring FIGS. 1 and 3, as discussed above, if first time duration 300 (e.g., 3 minutes and 30 seconds) is greater than the predefined threshold (e.g., 3 minutes, for example), determination component 110 may be configured to determine the initial time duration to be a sum of an integer number of segment time durations. That is, determination component 110 may be configured to determine the initial time duration to be first segment time duration 302. Alternatively, determination component 110 may be configured to determine the initial time duration to be a combination of first segment time duration 302 and second segment time duration 304, or second segment time duration 304 and third segment time duration 306, and/or any other combination of the segment time durations. As such, determination component 110 may be configured to determine the initial portion of the first video to be the first segment portion (with its corresponding segment time duration), the second segment portion (with its corresponding segment time duration), the third segment portion (with its corresponding segment time duration), and/or any combination thereof. As such, determination component 110 may be configured to determine the initial portion of the first video segment that is to be transcoded to be any number of the individual segment portions (e.g., the sum of an integer number of segment portions and/or segment time durations). As such, generation component 112 may be configured to generation one or more transcoded media files defining the visual information for the initial portion of the first video.

Referring back to FIG. 1, if the first time duration is greater than the predefined threshold, as discussed above, in response to receipt of the request for the first video from the client computing platform, generation component 112 may be configured to consecutively generate one or more transcoded media files for remaining segment portions of the first video in order of the individual segment time durations. Upon transmission of the one or more transcoded media files for the initial portion of the first video to the client computing platform, generation component 112 may be configured to generate one or more transcoded media files for remaining segment portions (e.g., segment portions that were not determined to be included as the initial portion, and thus were not transcoded) of the first video in an order in which the individual segment time durations span the first time duration. For example, as a user is viewing the one or more transcoded media files for the initial portion (e.g., the first segment portion) of the first video on the client computing platform, generation component 112 may generate one or more transcoded media files for the second segment portion, then the third segment portion, until all of the first video has been transcoded. In this manner, system 100 may be configured to effectuate transmission of the one or more transcoded media files for consecutive segment portions relative to what request component 114 previously transmitted to the client computing platform.

If the first time duration is greater than the predefined threshold, as discussed above, in response to receipt of the request for the first video from the client computing platform, generation component 112 may be configured to simultaneously generate one or more transcoded media files for multiple remaining segment portions of the first video. Upon transmission of the one or more transcoded media files for the initial portion of the first video to the client computing platform, generation component 112 may be configured to simultaneously generate one or more transcoded media files for multiple remaining segment portions (e.g., segment portions that were not determined to be included as the initial portion, and thus were not transcoded) of the first video. For example, as a user is viewing the one or more transcoded media files for the initial portion (e.g., the first segment portion) of the first video on the client computing platform, generation component 112 may simultaneously generate one or more transcoded media files for the second segment portion, the third segment portion, and/or any other remaining segment portions. The second segment portion and the third segment portion may be transcoded at the same time by generation component 112. In this manner, system 100 may be configured to effectuate transmission of the one or more transcoded media files for multiple remaining segment portions to the client computing platform as they are transcoded in and/or near real-time. This may reduce transcode latency more than other methods.

In some embodiments, generation component 112 may be configured to generate the one or more transcoded media files for the first video upon request from the client computing platform for the first video (e.g., request to play the first video, download the first video, and/or other requests) in and/or near real-time. System 100, via generation component 112, may be configured to reduce startup latency by generating one or more transcoded media files for the first few segments and/or portions of the video at a slightly lower video quality and/or resolution than is required by the client computing platform requesting the video. Generation component 112 may then generate one or more transcoded media files for the remainder of the video at a higher video quality and/or resolution and transmit that to the client computing platform.

Any generated transcoded media files may be stored for later use for the same requesting client computing platform and/or other requesting client computing platforms. As such, different versions of the first video in different formats and/or video quality outputs may be stored for various client computing platforms for future use.

In some implementations, in response to receipt of a request, generation component 112 may be configured to generate one or more transcoded media files and request component 114 may be configured to retrieve the one or more transcoded media files from generation component 112. Upon retrieval, request component 114 may be configured to effectuate transmission of the one or more transcoded media files to the client computing platform for display of the visual information defined by the one or more transcoded media files.

Figure 4:
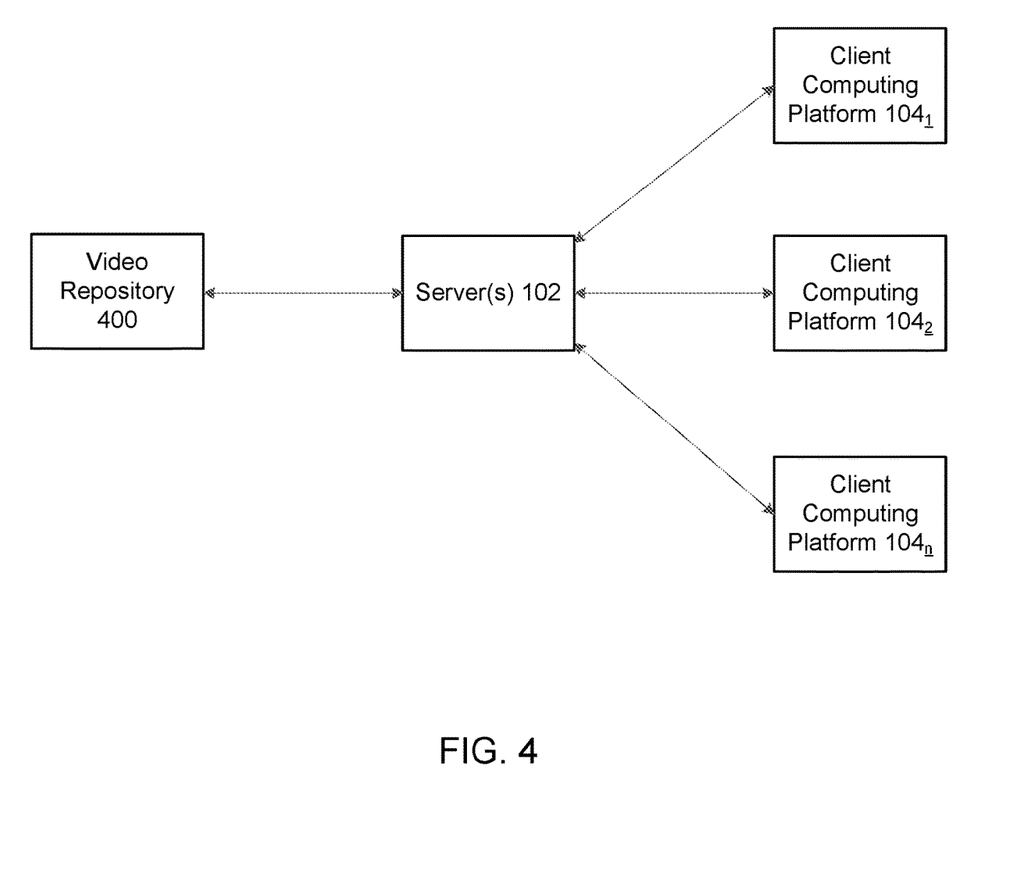
FIG. 4 illustrates an exemplary view of an implementation of the system of FIG. 1, in accordance with one or more implementations

Referring to FIG. 4, server(s) 102 may be configured to obtain multiple videos from video repository 300. Video repository 400 may be included within server(s) 102 and/or may be external to server(s) 102. A first video may have been stored in a first video format, depending on the individual client computing platform that captured the first video. Because the first video format may not be compatible with client computing platform $104_1$, client computing platform $104_2$, and/or other client computing platform(s) $104_n$, server(s) 102 may be configured to transcode one or more portions of the individual video segments from the first video format to a second video format, such that playback of the first video may be compatible with various client computing platform $104_1$, client computing platform $104_2$, and/or other client computing platform(s) $104_n$. For example, a request for the first video may be received by server(s) 102 from client computing platform $104_1$. The request may include specifications regarding compatibility of video formats for playback associated with client computing platform $104_1$. Based upon the received request and/or the specifications, server(s) 102 may be configured to obtain the first video in a second video format, which may include one or more previously generated transcoded media files and/or one or more transcoded media files generated in or near real-time compatible with client computing platform $104_1$. Server(s) 102 may be configured to effectuate transmission of the one or more transcoded media files defining the visual information in the second video format to client computing platform $104_1$ for display. If client computing platform $104_2$ and/or client computing platform $104_n$ request the first video with particular specifications regarding compatibility of video formats for playback purposes, server(s) 102 may obtain one or more previously generated transcoded media files and/or generate one or more transcoded media files compatible for display with client computing platform $104_2$ and/or client computing platform $104_n$ in or near real-time and effectuate transmission of the transcoded media files for display in a similar manner.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute machine-readable instruction components 106, 108, 110, 112, 114, and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 5:
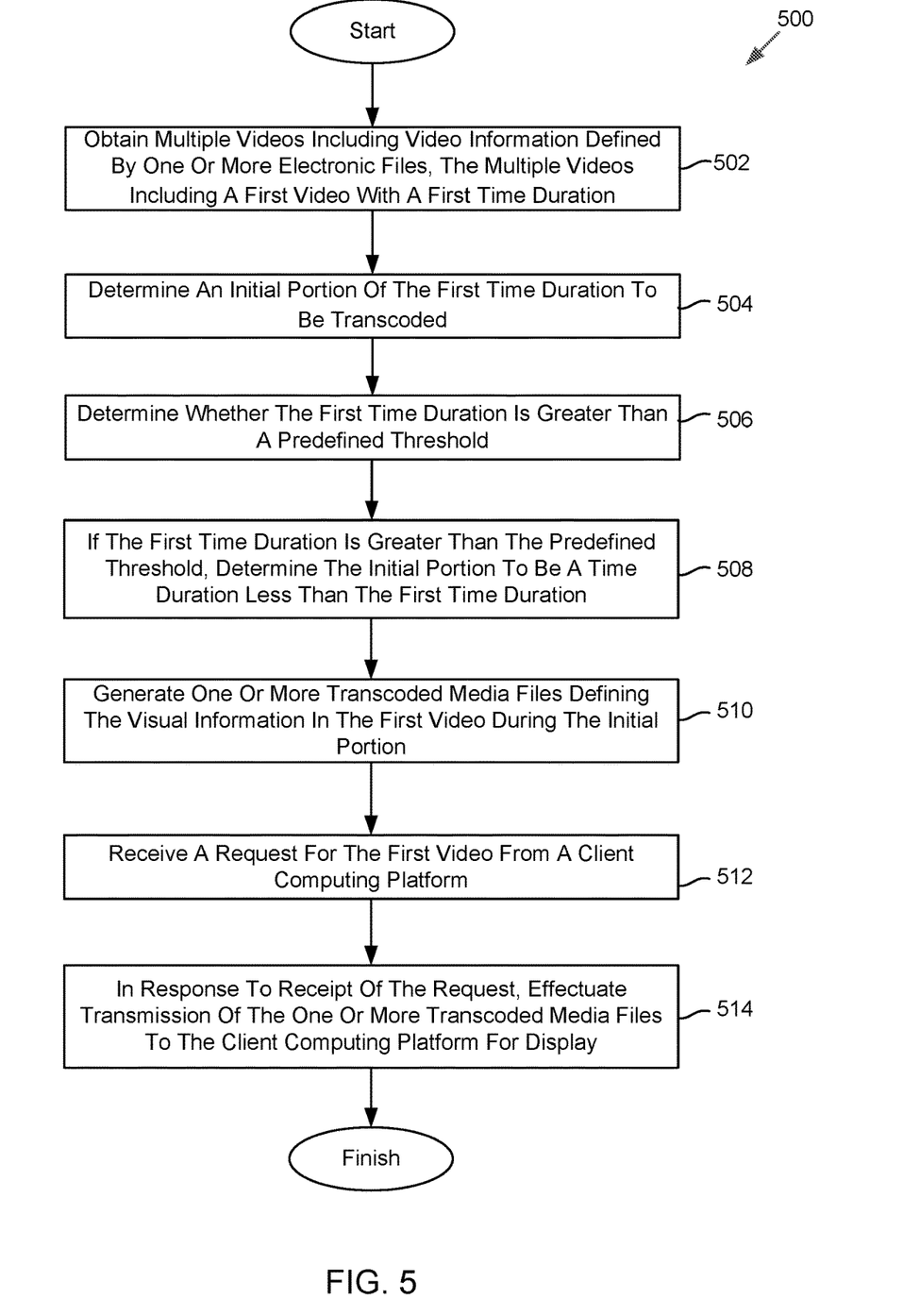
FIG. 5 illustrates a method for transcoding media files, in accordance with one or more implementations.

FIG. 5 illustrates a method 500 that transcodes videos, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, multiple videos may be obtained. The individual videos may have individual time durations. The individual videos may include visual information defined by one or more electronic media files. The multiple videos may include a first video with a first time duration. Operation 502 may be performed by a video component that is the same as or similar to video component 106, in accordance with one or more implementations.

At an operation 504, an initial portion of the first time duration where the one or more electronic media files of the first video are to be transcoded may be determined. Operation 504 may be performed by a determination component that is the same as or similar to determination component 110, in accordance with one or more implementations.

At an operation 506, whether the first time duration is greater than a predefined threshold may be determined. Operation 506 may be performed by a determination component that is the same as or similar to determination component 110, in accordance with one or more implementations.

At an operation 508, if the first time duration is greater than the predefined threshold, the initial portion may be determined to be a time duration less than the first time duration. Operation 508 may be performed by a determination component that is the same as or similar to determination component 110, in accordance with one or more implementations.

At an operation 510, one or more transcoded media files defining the visual information in the first video during the initial portion may be generated. Operation 510 may be performed by a generation component that is the same as or similar to generation component 112, in accordance with one or more implementations.

At an operation 512, a request for the first video may be received from a client computing platform. Operation 512 may be performed by a request component that is the same as or similar to request component 114, in accordance with one or more implementations.

At an operation 514, in response to receipt of the request, the one or more transcoded media files may be transmitted to the client computing platform for display. Operation 514 may be performed by a request component that is the same as or similar to request component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that transcodes videos, the system comprising: one or more physical computer processors configured by machine-readable instructions to:
   determine an initial portion of a time duration of a video for transcoding, the video including visual information defined by one or more electronic media files, the video stored within the one or more electronic media files in a first video format, wherein the initial portion is determined based on whether the time duration is greater than a predefined threshold such that the initial portion is determined to be an initial time duration that is less than the time duration in response to the time duration being greater than the predefined threshold;
   generate multiple transcoded media files of an initial portion of the video corresponding to the initial portion of the time duration, the initial portion of the video stored within the multiple transcoded media files in multiple video formats different from the first video format;
   receive a request for the video from a client computing platform, the request including specification regarding compatibility of video format for playback associated with the client computing platform;
   select at least one of the multiple transcoded media files for transmission to the client computing platform based on the compatibility of video format for playback associated with the client computing platform; and
   effectuate transmission of one or more selected transcoded media files to the client computing platform.

2. The system of claim 1, wherein the one or more physical computer processors are further configured to:
   define one or more segment portions within the video, individual segment portions having segment time durations, wherein a sum of the individual segment time durations for the video is equal to the time duration; and
   store the one or more segment portions as separate individual segment portions of the video.

3. The system of claim 2, wherein in response to the time duration being greater than the predefined threshold, the initial time duration is a sum of an integer number of segment time durations.

4. The system of claim 3, wherein in response to the time duration being greater than the predefined threshold and in response to receipt of the request, one or more transcoded media files for remaining segment portions of the video are consecutively generated in order of the individual segment time durations.

5. The system of claim 3, wherein in response to the time duration being greater than the predefined threshold and in response to receipt of the request, one or more transcoded media files for multiple remaining segment portions of the video are simultaneously generated.

6. The system of claim 1, wherein in response to the time duration being equal to or less than the predefined threshold, the initial portion of the time duration is determined to be the time duration.

7. The system of claim 1, wherein the initial time duration is a proportion of the time duration.

8. The system of claim 1, wherein the initial time duration is a predefined time duration of the time duration.

9. The system of claim 1, wherein the multiple transcoded media files include a lower resolution version of the initial portion of the video than a resolution of the video.

10. The system of claim 1, wherein the multiple transcoded media files for the initial portion of the video include a link configured to return one or more transcoded media files for one or more remaining portions of the video, the link configured to be initialized by a user of the computing platform prior to or during consumption of the multiple transcoded media files for the initial portion of the video.

11. A method that transcodes videos, the method performed by a computing system including one or more processors, the method comprising:
determining, by the computing system, an initial portion of a time duration of a video for transcoding, the video including visual information defined by one or more electronic media files, the video stored within the one or more electronic media files in a first video format, wherein the initial portion is determined based on whether the time duration is greater than a predefined threshold such that the initial portion is determined to be an initial time duration that is less than the time duration in response to the time duration being greater than the predefined threshold;
generating, by the computing system, multiple transcoded media files of an initial portion of the video corresponding to the initial portion of the time duration, the initial portion of the video stored within the multiple transcoded media files in a multiple video formats different from the first video format;
receiving, by the computing system, a request for the video from a client computing platform, the request including specification regarding compatibility of video format for playback associated with the client computing platform;
selecting, by the computing system, at least one of the multiple transcoded media files for transmission to the client computing platform based on the compatibility of video format for playback associated with the client computing platform;
and effectuating, by the computing system, transmission of one or more selected transcoded media files to the client computing platform.

12. The method of claim 11, further comprising:
defining one or more segment portions within the video, individual segment portions having segment time durations, wherein a sum of the individual segment time durations for the video is equal to the time duration; and
storing the one or more segment portions as separate individual segment portions of the video.

13. The method of claim 12, wherein in response to the time duration being greater than the predefined threshold, the initial time duration is a sum of an integer number of segment time durations.

14. The method of claim 13, wherein in response to the time duration being greater than the predefined threshold and in response to receipt of the request, one or more transcoded media files for remaining segment portions of the video are consecutively generated in order of the individual segment time durations.

15. The method of claim 13, wherein in response to the time duration being greater than the predefined threshold and in response to receipt of the request, one or more transcoded media files for multiple remaining segment portions of the video are simultaneously generated.

16. The method of claim 11, wherein in response to the time duration being equal to or less than the predefined threshold, the initial portion of the time duration is determined to be the time duration.

17. The method of claim 11, wherein the initial time duration is a proportion of the time duration.

18. The method of claim 11, wherein the initial time duration is a predefined time duration of the time duration.

19. The method of claim 11, wherein the multiple transcoded media files include a lower resolution version of the initial portion of the video than a resolution of the video.

20. The method of claim 11, wherein the multiple transcoded media files for the initial portion of the video include a link configured to return one or more transcoded media files for one or more remaining portions of the video, the link configured to be initialized by a user of the computing platform prior to or during consumption of the multiple transcoded media files for the initial portion of the video.

* * * * *

UNITED STATES PATENT AND TRADEMARK OFFICE
CERTIFICATE OF CORRECTION

PATENT NO. : 10,645,407 B2  
APPLICATION NO. : 16/369225  
DATED : May 5, 2020  
INVENTOR(S) : Cedric Fernandes Page 1 of 1

It is certified that error appears in the above-identified patent and that said Letters Patent is hereby corrected as shown below:

In Claim 11, Column 17, Line 29, please delete "files in a multiple video formats" and insert --files in multiple video formats--, therefor.

Signed and Sealed this  
Twenty-eighth Day of July, 2020

Andrei Iancu  
*Director of the United States Patent and Trademark Office*